(No Model.) 3 Sheets—Sheet 2.
E. A. NEWMAN.
COCK OR FAUCET.
No. 389,097. Patented Sept. 4, 1888.
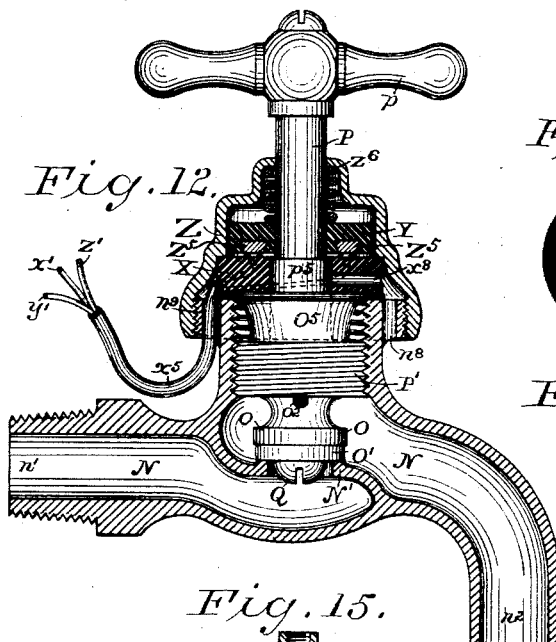
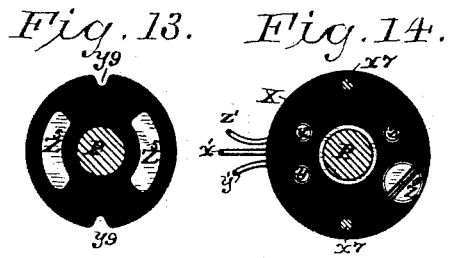
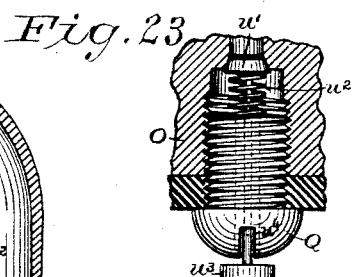
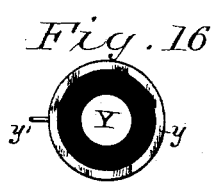
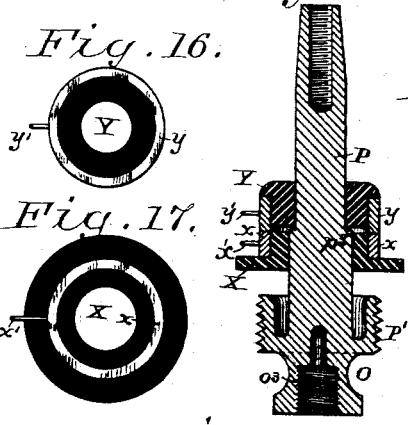
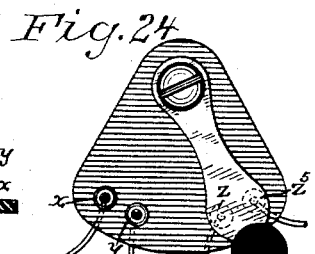
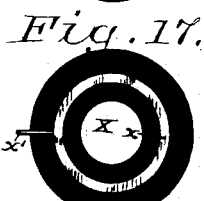
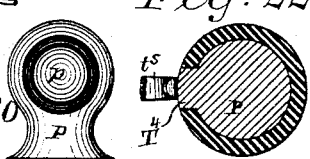
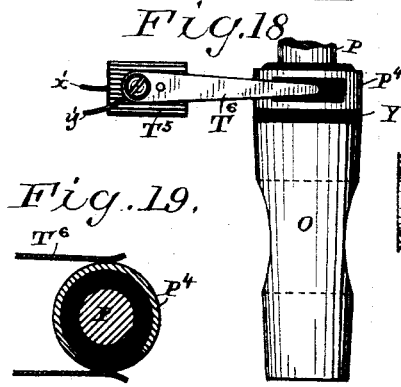
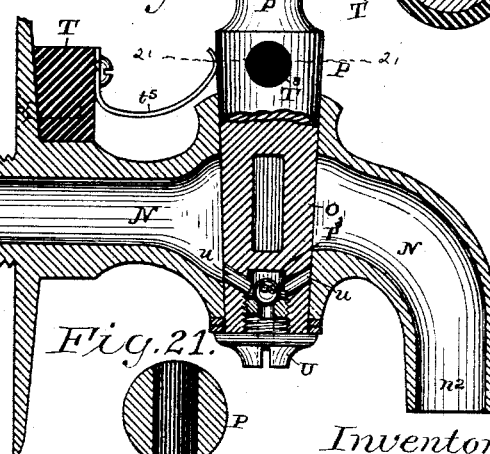
Witnesses
H. C. Newman,
C. M. Newman,
Inventor
Edwin A. Newman,
By his Attorneys
Baldwin Hopkins & Peyton (No Model.) 3 Sheets—Sheet 3.
E. A. NEWMAN.
COCK OR FAUCET.
No. 389,097. Patented Sept. 4, 1888.
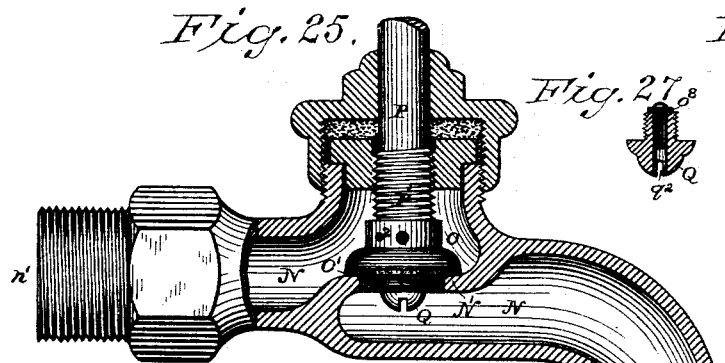
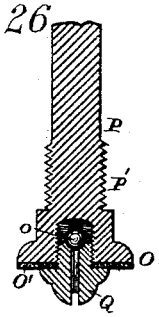
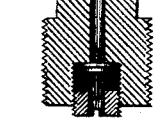
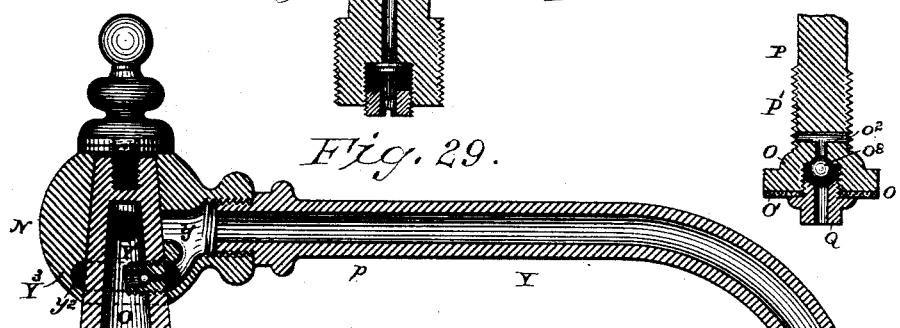
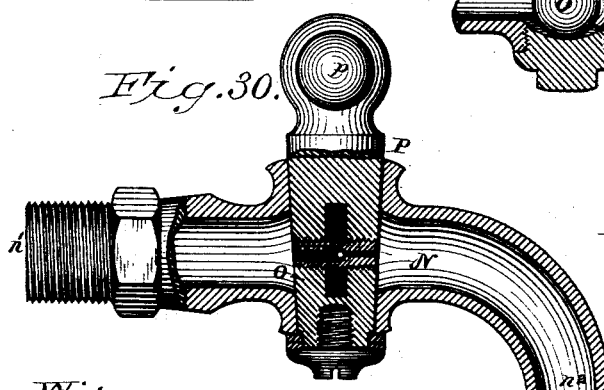
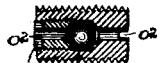
Witnesses,
H. C. Newman,
C. M. Newman,
Inventor,
Edwin A. Newman,
By his Attorneys
Baldwin Hopkins & Peyton

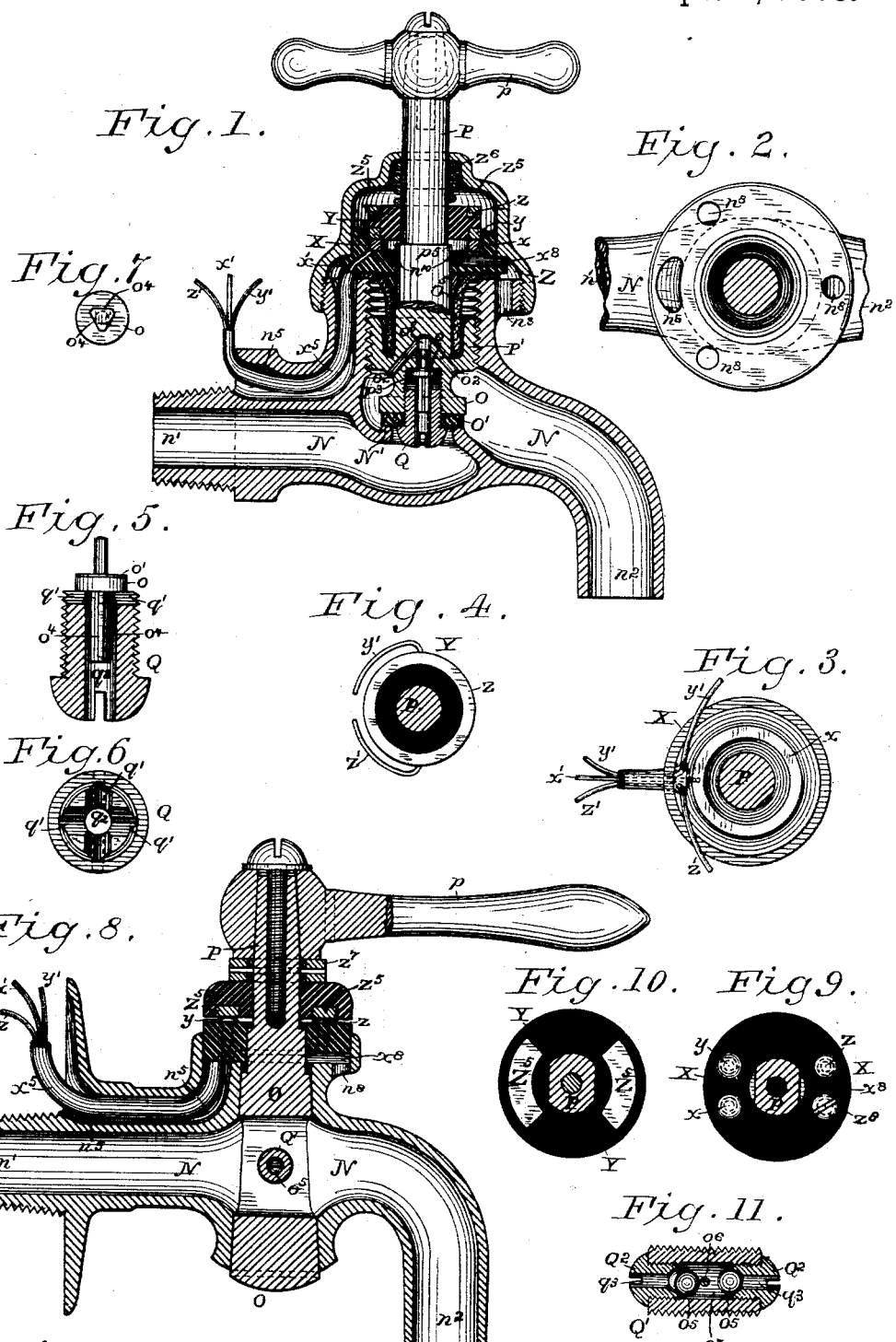

UNITED STATES PATENT OFFICE.

EDWIN A. NEWMAN, OF WASHINGTON, DISTRICT OF COLUMBIA, ASSIGNOR TO THE NEWMAN ANTI-FREEZING WATER PIPE COMPANY, OF CHICAGO, ILLINOIS.

COCK OR FAUCET.

SPECIFICATION forming part of Letters Patent No. 389,097, dated September 4, 1888.

Application filed November 5, 1887. Serial No. 254,413. (No model.)

*To all whom it may concern:*

Be it known that I, EDWIN A. NEWMAN, a citizen of the United States, residing at Washington, in the District of Columbia, have invented certain new and useful Improvements in Cocks or Faucets, of which the following is a specification.

The object of my invention is to provide a cock or faucet with one or more electric switches or contacts of an improved construction, whereby electric circuits may be made or broken to operate at a distance valves or other devices in a pipe system, and also to provide a cock or faucet with an improved packing and a waste or discharge opening so arranged as to prevent the escape of water around the valve stem or spindle or over the electric switches, and also to provide, in connection with electric switches or contacts in a faucet, a ventilating-valve to facilitate the draining of the pipes in connection with which the faucet is used.

In the accompanying drawings, Figure 1 is a central vertical section of one form of my improved faucet. Fig. 2 is a plan view of the valve-casing with parts broken away. Fig. 3 is a plan view of the lower switch-block, showing the wires broken away and the valve-stem in section. Fig. 4 is a similar view of the upper switch-block. Figs. 5, 6, and 7 are detail views of the ventilating-valve. Fig. 8 is a vertical central section of a faucet having a plug-valve with a modified form of my improvements applied. Fig. 9 is a bottom view of the upper switch-block, showing the valve-stem in section. Fig. 10 is a plan view of the lower switch-block with the valve-stem in section. Fig. 11 is a section of the ventilating devices. Fig. 12 is a vertical central section of another modified form of my improved faucet. Figs. 13 and 14 are detail views of the switch-blocks. Fig. 15 shows a modified form of switch-block that may be applied to the casing of the faucet shown in Fig. 12. Figs. 16 and 17 are detail views of the same. Fig. 18 shows another form of switch-block. Fig. 19 is a cross-section of the same. Fig. 20 is a vertical central section of a faucet, showing further modifications of my invention. Fig. 21 is a cross-section on the line 21 21 of Fig. 20. Fig. 22 shows a modified form of switch. Fig. 23 shows ventilating devices controlled by an electro-magnet. Fig. 24 shows an ordinary switch that may be mounted on or near a faucet, and which may be operated, either by hand or by the faucet, for changing electric circuits in the valve system. Fig. 25 is a vertical central section of another form of faucet where the water may enter above the valve. Fig. 26 is a vertical central section of the valve-stem, showing the ventilating devices. Figs. 27 and 28 show modifications of the ventilating devices shown in Fig. 26. Figs. 29 and 30 are vertical central sections of two other kinds of faucets with my ventilating devices applied. Fig. 31 is a detail view of the ventilating devices. Figs. 32, 33, and 34 show other kinds of valves that may be used by me.

I have shown in the drawings my invention applied to several kinds of faucets and valves, as I find it desirable to vary somewhat the ventilating devices, switches, and caps to suit the faucets and valves to which they are applied.

I have shown ventilating-valves, in connection with the switches on the faucet, as it is desirable to have some means of admitting air to the pipe system in order to properly drain it.

Referring to the drawings, and first to the first seven figures, N indicates the body of the faucet or shell, $n'$ the water entrance, and $n^2$ the discharge opening.

N' is the valve-seat, and O the valve; O', a washer on the face of the valve; P, the valve-stem, and $p$ the handle.

The valve stem is enlarged at P', and screw-threaded, as shown, to engage with corresponding screw-threads in the shell or casing. The shell or casing is provided with a passage, $n^3$, through which extend the electric wires $z'$, $x'$, and $y'$, incased in a rubber tube, $x^5$. The inner ends of the wires $y'$ and $z'$ are electrically connected, respectively, with the lower and upper metallic rings, $y$ and $z$, of the upper switch-block, Y, which is made of insulating material, so as to separate the rings $y$ and $z$ and the spindle P, which passes entirely through it. The wire $x'$ connects with a metallic ring, $x$, on the upper face of the lower switch-block, X, also made of insulating material and arranged above the valve shell proper. Circuits may be made and broken between the ring $x$ and ring $y$, and between the ring $z$ and the top of the casing, (connected to ground,) in a manner hereinafter explained.

The block X is provided with an annular recess, $n^{10}$, around the valve-stem, and grooves $x^3$, connecting with the recess $n^{10}$ and with discharge-openings $n^8$ in the main shell or casing. The object of this is that should any water find its way above the main casing it will be discharged through the openings $n^8$, and not over the switches and near the handle. $O^5$ indicates a packing clamped between the top of the main casing and the lower switch-block, X, and extending down into a recess in the enlargement of the valve-stem. A cap, Z, encircles the valve-stem and screws onto the main shell or casing, as indicated in the drawings, so as to cover completely the switch-blocks and other interior parts of the faucet.

A spring, $z^6$, is interposed between the cap Z and the upper switch-block and serves to hold it in contact with the lower block. When the valve O is closed, the switch-blocks X and Y are in electrical connection; but when the valve is raised the shoulder $p^5$ on the valve-stem lifts the block Y away from the block X up to the top of the casing, so that the circuit is broken between $x$ and $y$ and closed between $z$ and the casing at $z^5$. The utility of such an organization is obvious, as the opening and closing of the faucet may be made to operate valves at a distance. For instance, the switch in the faucet may control the electrically-operated valves between the street-main and the house-pipes and between the house-pipes and the drain-pipes, as in a pipe system described in an application for Letters Patent of the United States, filed by me November 5, 1887, Serial No. 254,414.

The ventilating devices are located in the end of the valve O.

Q is a hollow screw-plug that enters part way into a recess or chamber, $P^3$, in the valve O.

$o^3$ is a vertical socket for the stem of the ventilating-valve $o$, and also serves as an air-passage connecting with the oblique passages $o^2$ $o^2$ that lead to the discharge-opening in the faucet.

The upper face of the valve may be provided with a leather or other washer, $o'$, to insure a tight fit against the upper valve-seat. The valve $o$ is somewhat narrower than the chamber $P^3$, and the upper end of the plug Q is provided with radial grooves $q'$, which serve to establish a communication for air between the chamber $P^3$ and the vertical opening $g^3$ in the plug Q. The lower valve-stem of the valve $o$ is cut away or open at $o^4$, as shown in Figs. 5, 6, and 7, to allow the air to circulate.

Ordinarily when the water is turned on from the street-main and the water in the house-pipes is under pressure, the valve $o$ will be raised and held tightly against its upper seat, so as to close communication between the chamber $P^3$ and the passages $o^3$ and $o^2$; but when the water is cut off from the street-main and a discharge-valve is opened the valve $o$ will drop and air will rush in through the openings $o^2$, passage $o^3$, chamber $P^3$, grooves $q'$, and passage $q^2$ to the pipes, and thus facilitate their draining.

In Fig. 8 a different kind of faucet is shown—viz., a turning-plug—and the details of the switches and ventilating-valve used in this connection are shown in Figs. 9, 10, and 11. The upper switch-block, Y, is provided with metallic segments $Z^5$ $Z^5$, to which the wires $z'$ and $y'$ are connected, as indicated by dotted lines, Fig. 8, and the lower switch-block, X, is provided with metallic contact-buttons $x$ $y$ $z$, to which the wires $x'$, $y'$, and $z'$ are respectively connected. The screw $z^8$ connects with the casing of the faucet, and so to ground. A groove, $x^5$, is made in the lower switch-block to carry the water to the discharge-opening $n^8$, should it rise to that point on the spindle. As will be seen, the electric circuits may be made and broken in the act of turning the handle of the faucet. A spring, $z^7$, is interposed between the handle $p$ and the upper switch-block to hold the plug in place.

The ventilating-valve is arranged transversely in the plug and is constructed as shown in Fig. 11.

$Q'$ is a hollow screw-threaded plug arranged transversely in a screw-threaded socket in the plug or valve O. In each end of the plug is a screw-plug $Q^2$ $Q^2$. The inner ends of the plugs are separated, leaving a chamber, $o^7$, between them. Passages $q^3$ lead through the plugs $Q^2$ to the chamber $o^7$, and the inner ends of the plugs are provided with valve-seats for the ball-valves $o^5$. $o^6$ is a transverse rod extending across the chamber $o^7$ to keep the valves apart. Should water enter through one of the openings $q^3$, the valve at the opposite opening will be closed by the water-pressure; but the water-pressure being removed both valves will open and the air may pass into the pipes freely.

In Figs. 12, 13, and 14 further modifications are shown. The switch-blocks and metallic contact-makers are arranged somewhat as shown in Figs. 8, 9, and 10, but the other parts of the faucet are mainly arranged as in Figs. 1 to 7, inclusive. Upright rods $x^7$ are secured to the lower switch-block, X, and fit in notches $y^9$ in the upper block, Y, so as to guide it as it rises and falls.

Figs. 15, 16, and 17 show another modification. Here the switch-blocks are provided with concentric rings $x$ and $y$, which are connected with their appropriate circuit-wires, $x'$ and $y'$.

Figs. 18 and 19 show a modification of the switch. Here a metallic broken ring, $P^4$, is insulated from the spindle P and plug O. The space between the ends of the ring is filled by insulating material. $T^6$ are spring contact-fingers secured to an insulating-block, $T^5$, and bearing on the ring and on the insulating material in the space between the ends of bearing. The circuit-wires $x'$ and $y'$ connect with the fingers. When one finger is on the insulating material in the space between the ends of the ring and one on the ring, the circuit will be broken; but when both fingers are on the ring the circuit will be closed.

In Figs. 20 and 21 a single contact-finger, $t^5$, is secured to an insulating-block, T, and is connected with one pole of the battery, the other pole of the battery being connected with the metallic part of the faucet. A plug, $T^3$, of insulating material, extends transversely through the plug P, and when the contact-finger rests on the plug $T^3$ the circuit will be broken; but when the finger rests on the metallic part of the plug the circuit will be closed.

In Fig. 22 instead of having a plug of insulating material a broken ring of insulating material is used. A lug, $T^4$, from the plug P projects through between the ends of the ring.

The ventilating devices in Fig. 20 are arranged by forming a chamber, $P^3$, in the bottom of the plug, having at its upper end passages $u$, which communicate with the main water-passage-way in the faucet. A screw-plug, U, is inserted in the end of the plug O, and a passage leads from the outside to the chamber. A ball-valve, $O^3$, rests in a valve-seat over the opening and closes the opening when the water in the pipes is under pressure. When not under pressure, air may enter from the outside through the opening, lift valve $O^3$, and pass into the pipes through one of the passages $u$.

Fig. 23 shows an arrangement for operating the ventilating-valve by electricity. This is desirable, as it is sometimes convenient to operate the valve from a distance. In this arrangement the valve $u'$ is carried on a spindle, $u^4$, on the end of which is an armature, $u^3$, of an electro-magnet, $U^2$. The valve is held normally closed by a spring, $u^2$. When open, the air may pass in through the opening around the spindle $u^4$ into the chamber under the valve $u'$, and thence past the valve into the pipes. The electro-magnet may be supported on the valve-shell N, as indicated in the drawings.

Fig. 24 simply shows a hand-switch by which electric circuits may be made and broken to operate a distant valve. The switch should be placed near a faucet, so that the water may be turned on or off, as may be desired.

In Figs. 25, 26, 27, and 28 further modifications of the ventilating devices are shown. There is an opening, $q^2$, through the screw-plug Q, and an opening, $o^2$, extends from the air-chamber $P^3$ to the entrance side of the faucet, the other opening $q^2$ communicating with the discharge side. Either a ball-valve, $o$, may be used or a puppet-valve, $o^3$, as shown in Fig. 27. The passages may also be arranged as shown in Fig. 28.

In Fig. 29 another kind of faucet is shown. Here the ventilating devices consist of a screw-plug carrying a ball-valve. The body of the faucet is formed with a chamber, $y^2$, that connects with the discharge-pipe and handle $p$ and through the ventilating devices with the water-entrance. The form of faucet is well known, and the use of my improvements is obvious.

Figs. 30 and 31 show a faucet having a turning-plug, with the ventilating devices arranged transversely across the plug. The screw-plug $Q^2$, which forms the body of the device, is provided with a screw-plug, $o^9$, so that the valve may be placed in position conveniently between the air-ports $o^2$ $o^2$.

Fig. 32 shows a ventilating-valve consisting of a ball, O. This also serves as the main valve of the faucet; but when the water-pressure from behind is removed it will drop and air will be freely admitted.

Fig. 33 shows another form of ventilating-valve, consisting of a puppet-valve arranged in a chamber in a screw-plug that may be inserted in a pipe at any convenient point in the pipe system.

Fig. 34 shows a similar arrangement with the plug in position in the pipe. In this instance a ball-valve is employed.

As before remarked, my present improvements are specially designed for use in connection with the apparatus described in my application for Letters Patent of the United States, filed by me November 5, 1887, Serial No. 254,414. In said application I have shown devices for regulating the flow of water in pipes by the means of electrically-controlled valves, in which cocks and faucets of the kind herein described are used. Reference is made to said application for a detailed description of some of the ways of the application of my invention to a pipe system.

I claim as my invention—

1. The combination of the shell or casing, the valve-spindle, the upper and lower switch-blocks, and the metallic contacts carried thereby, substantially as set forth.

2. The combination of the shell or casing, the valve-spindle, the upper and lower switch-blocks, the metallic contacts carried thereby, and their electric-circuit connections, a cap or casing for the switch-blocks, and a spring interposed between the cap and the upper switch-block, substantially as set forth.

3. The combination of the shell or casing, the main valve, the ventilating-valve therein, and the switch-blocks operated by the opening and closing of the main valve, substantially as set forth.

4. The combination of the shell or casing, the main valve, the electric-circuit-changing switches, and the block X, beneath the switch-blocks having a drain-opening extending to a discharge-opening in the shell or casing, substantially as set forth.

In testimony whereof I have hereunto subscribed my name.

EDWIN A. NEWMAN.

Witnesses:
LLOYD B. WIGHT,
ALLAN McLANE ABERT.

Corrections in Letters Patent No. 389,097.

It is hereby certified that in Letters Patent No. 389,097, granted September 4, 1888, upon the application of Edwin A. Newman, of Washington, District of Columbia, for an improvement in "Cocks or Faucets," errors appear in the printed specification requiring the following corrections: In line 120, page 2, the compound word "switch-blocks" should be stricken out and the words *electric-circuit-changing switch* inserted instead, and in lines 124–125, same page, the words "electric-circuit-changing switches," should be stricken out and the compound word *switch-blocks* inserted instead; and that the said Letters Patent should be read with these corrections therein that the same may conform to the record of the case in the Patent Office.

Signed, countersigned, and sealed this 18th day of September, A. D. 1888.

[SEAL.]

D. L. HAWKINS,
*Assistant Secretary of the Interior.*

Countersigned:
BENTON J. HALL,
*Commissioner of Patents.*